United States Patent
Noll et al.

(10) Patent No.: US 7,945,263 B2
(45) Date of Patent: May 17, 2011

(54) MOBILE STATION HANDOVER FOR BASE STATIONS WITH ADAPTIVE ANTENNA SYSTEM

(75) Inventors: John Noll, Satellite Beach, FL (US); Jeffrey W. Smith, Palm Bay, FL (US); Mark Nelson, Oviedo, FL (US); John F. Schwaller, Palm Bay, FL (US)

(73) Assignee: Treble Investments Limited Liability Company, Wilmington, DE (US)

( * ) Notice: Subject to any disclaimer, the term of this patent is extended or adjusted under 35 U.S.C. 154(b) by 1147 days.

(21) Appl. No.: 11/288,712

(22) Filed: Nov. 29, 2005

(65) Prior Publication Data

US 2007/0123257 A1 May 31, 2007

(51) Int. Cl.
*H04Q 7/20* (2006.01)

(52) U.S. Cl. ..... 455/436; 455/456; 455/422; 455/562.1; 455/67.11

(58) Field of Classification Search .................. 455/436, 455/562.1, 456, 67.11, 561; 370/465
See application file for complete search history.

(56) References Cited

U.S. PATENT DOCUMENTS

| | | | |
|---|---|---|---|
| 5,924,020 A | 7/1999 | Forssen et al. | |
| 6,356,763 B1 * | 3/2002 | Kangas et al. | 455/456.1 |
| 6,477,388 B1 | 11/2002 | Schmutz | |
| 6,571,097 B1 * | 5/2003 | Takai | 455/436 |
| 6,931,235 B2 * | 8/2005 | Kline et al. | 455/67.11 |
| 6,983,172 B2 * | 1/2006 | Harrison | 455/561 |
| 7,433,416 B1 * | 10/2008 | Banister | 375/267 |
| 2003/0002525 A1 * | 1/2003 | Grilli et al. | 370/465 |
| 2006/0030365 A1 * | 2/2006 | Hovers et al. | 455/562.1 |

OTHER PUBLICATIONS

Final Office Action dated Jan. 17, 2006 for U.S. Appl. No. 11/333,193.

* cited by examiner

*Primary Examiner* — Charles N Appiah
*Assistant Examiner* — Michael T Vu
(74) *Attorney, Agent, or Firm* — Snell & Wilmer L.L.P.

(57) ABSTRACT

Method for transferring service for a mobile station call signal from a first base transceiver station to a second base transceiver station in a wireless mobile telecommunication system, while a call is in progress. The method can include receiving at a base transceiver station an access burst from a mobile station with a call already in progress and requiring service from the base transceiver station. Based on the received access burst, the base transceiver station can electronically steer a beam of an adaptive antenna array of the base transceiver station toward a location of the mobile station.

6 Claims, 10 Drawing Sheets

MOBILE STATION HANDOVER FOR BASE STATIONS WITH ADAPTIVE ANTENNA SYSTEM

BACKGROUND OF THE INVENTION

1. Statement of the Technical Field

The inventive arrangements relate to cellular telephone systems and more particularly to handover of mobile stations from one base station to another.

2. Description of the Related Art

Cellular communication systems generally consist of base stations that transmit and receive radio signals with numerous mobile stations. These communications occur simultaneously on different radio channels of each base station. Conventional base stations commonly employ broad beam antennas to support radio signal coverage over large geographic areas, with each base station intended to cover a different area. The coverage area of a base station will overlap to some extent with the coverage areas of adjacent base stations. These areas of overlap are generally at the outer regions of each base station's coverage areas.

The basic architecture of cellular communication systems and the mobile nature of mobile stations are such that the system does not rely on a fixed set of radio links. Consequently, a call in a cellular communication system is often switched among a plurality of different channels or cells. This process is called handover or handoff.

Due to limited radio spectrum, cellular systems typically employ frequency reuse. This is the repeated use of the same radio frequency channels by multiple base stations throughout a cellular network. The use of the same frequency channels by different mobiles and base stations can cause interference between users of the same frequency channel, known as co-channel interference. To limit co-channel interference, base stations using the same radio channels must be geographically separated by a sufficient distance. A cellular system may employ a frequency reuse of 7, or N=7. This indicates that the same frequency channel may be used in 1 out of 7 base stations in a pattern that attempts to minimize co-channel interference. Frequency reuse limits the overall capacity in a cellular network. The lower the reuse number, the higher the frequency reuse and the greater overall network capacity. For example, a network that has a reuse of N=1 has 7 times the capacity of that using a reuse of N=7. However, in a typical cellular network a frequency reuse of N=1 (or even reuse levels near this level) is not achievable due to co-channel interference.

There are numerous methods that are used to reduce or distribute co-channel interference to allow greater frequency reuse. For example, adaptive antenna arrays can be used to reduce interference by focusing RF energy towards an intended recipient while reducing RF energy directed towards un-intended co-channel users of the same frequency channel. This is accomplished using an array of antenna elements whereby RF energy is electronically steered by adapting the phase and amplitude of radio signals transmitted and received through the antenna array. Adaptive arrays provide significant benefits with regard to addressing the problem of co-channel interference. These systems have the ability to control where the radio signal is received or not received based on spatial properties of the signal.

Adaptive focus and nulling is the process whereby the spatial properties of transmitters received in an uplink signal are analyzed and a solution for the downlink transmission is determined. The desired downlink signal results in a spatial solution that will "focus" RF energy at the geolocation of the intended receiver while reducing or "nulling" RF energy at the geolocations of co-channel users on the same radio channel, thus reducing co-channel interference.

When transmitting an RF signal, a base station utilizing an adaptive array will focus RF energy in a desired direction. The direction is determined by analyzing spatial properties of a received signal coming from the mobile station at the location toward which the base station is to transmit. However, during a handover from one cell to another, the base station targeted for the handover has not received a signal such that it knows where to focus its transmitted energy. If the targeted base station does not know where to transmit its energy, handover failures will occur. Such handover failures will result in dropped calls.

SUMMARY OF THE INVENTION

The invention concerns a method for transferring service for a mobile station call signal from a first base transceiver station to a second base transceiver station in a wireless mobile telecommunication system while a call is in progress. The method can include receiving at a base transceiver station an access burst from a mobile station with a call already in progress and requiring service from the base transceiver station. Based on the received access burst, the base transceiver station can electronically steer a beam of an adaptive antenna array of the base transceiver station toward a location of the mobile station. The electronic steering can be accomplished by generating at least one set of weighting parameters for the adaptive antenna array based on the received access burst. According to one aspect, the method can include automatically delaying a response to the access burst until a predetermined number of the access bursts have been received by the base transceiver station. According to another aspect, the weighting parameters can be generated so as to produce an antenna pattern for the adaptive array exclusive of nulls intentionally positioned for avoiding interference with co-channel users.

The invention can also be implemented as a base station transceiver station in a wireless mobile telecommunication system. The base transceiver station can be configured for receiving an access burst from a mobile station with a call already in progress and requiring service from the base transceiver station. In this regard, the base transceiver station can include a digital signal processor for detecting the access burst. The base transceiver station can also include an adaptive array antenna system. The adaptive array antenna system can electronically steer a beam produced by the adaptive array antenna system toward a location of the mobile station based on the access burst. According to one aspect, a digital signal process or a control processor associated with the base transceiver station can be configured to detect a predetermined number of the access bursts before the base transceiver station transmits a response to the access burst. The base transceiver station can be configured so that the adaptive antenna array system or a processor associated with the adaptive antenna array system generates at least one set of weighting parameters. The weighting parameter can be generated based on one or more of the predetermined number of the access bursts. According to another aspect, the adaptive antenna array can determine the weighting parameters to produce an antenna pattern for the adaptive array exclusive of nulls intentionally positioned for avoiding interference with co-channel users.

According to an alternative embodiment, the inventive arrangements can include an alternative method for transferring service for a mobile station call signal from a first base transceiver station to a second base transceiver station in a wireless mobile telecommunication system while a call is in progress. The method can include monitoring with the second base transceiver station at least one transmission from the mobile station to the first base transceiver station. The method can also include electronically steering a beam of an adaptive antenna array of the base transceiver station toward a location of the mobile station based on the monitoring step. According to one aspect of the invention, at least one set of weighting parameters can be generated for the adaptive antenna array based on the monitoring step. In response to an access burst received from the mobile station, the base transceiver station can transmit to the mobile station information for communicating with the second base station using the beam.

According to another aspect, the transmission or transmissions from the mobile station to the first base transceiver station can be transmitted on a first frequency and the base station can communicate with the mobile station on a second frequency. In that case, the method can include compensating for frequency differences between the first frequency and a second frequency when generating the weighting parameters.

The method can further include analyzing with the second base transceiver station an access channel on which the mobile station can communicate with the second base transceiver station to access the services of the second base transceiver. The analyzing step can include identifying at least one co-channel station that is also using the access channel. Using this information, at least one null can be generated with the adaptive antenna array concurrently with the beam steering step. The null can be advantageously directed toward the one or more co-channel station to mitigate interference.

The foregoing method can be implemented in a wireless mobile telecommunication system. The system can include a base transceiver station in a first cell of the wireless mobile communication system. The base transceiver station can be responsive to a handover request for monitoring at least one transmission of a call already in progress between a mobile station and an originating base transceiver station in a second cell of the wireless communication system. Further, the base transceiver station can include an adaptive antenna system including an adaptive antenna array and an adaptive antenna processor configured for electronically steering a beam of the adaptive antenna array toward a location of the mobile station based on the monitoring step. The adaptive antenna processor can generate at least one set of weighting parameters for the adaptive antenna array based on the monitoring. The monitored transmission will generally be transmitted on a traffic channel of the originating base transceiver station. Accordingly, the adaptive antenna processor can compensate for frequency differences between the traffic channel and an access channel that the base transceiver station will use to communicate with the mobile station.

The base transceiver station can also include a control processor. The control processor can be responsive to at least one access request from the mobile station so as to cause the base transceiver station to transmit selected information to the mobile station using the beam. For example, the selected information can include physical channel information.

According to one aspect of the invention, the adaptive antenna processor can analyze an access channel on which the mobile station can communicate with the base transceiver station to access the services of the second base transceiver. The purpose of such analysis can be to identify at least one co-channel station that is using a frequency common to the access channel. Using this information, the adaptive antenna system can generate at least one null with the adaptive antenna array concurrently with the electronically steering step. The null or nulls can be directed toward the one or more co-channel stations.

According to a third embodiment, the invention can also include yet another method for transferring service for a mobile station call signal from a first base transceiver station to a second base transceiver station in a wireless mobile telecommunication system while a call is in progress. This third embodiment can include receiving at a base transceiver station an access burst from a mobile station with a call already in progress and requiring service from the base transceiver station. The method can also include the step of controlling an adaptive antenna array of the base transceiver station. The adaptive antenna array can be controlled so as to generate a wide area antenna pattern when transmitting a response to the mobile station based on the access burst. For example, the response can include physical channel information useful to the mobile station for communicating with the base transceiver station on a traffic channel of the BTS. After transmitting the response using the wide area antenna pattern, the process can continue with the base transceiver station communicating with the mobile station on a traffic channel using adaptive array signal processing to produce a focused beam in a direction of the mobile station. Adaptive array signal processing can also be used to produce a pattern of nulls for reducing co-channel interference with co-channel stations caused by transmissions from the base transceiver station to the mobile station. According to one aspect of the invention, the method can include temporarily increasing the RF power level when transmitting the response from the BTS to the mobile station, to at least partially compensate for a decreased gain when using the wide area antenna pattern.

The foregoing embodiment can also be implemented as part of a wireless telecommunication system. For example, the invention can include a base transceiver station in a first cell of the wireless telecommunication system that is responsive to a handover request. The handover request can cause the base transceiver system to monitor an access channel to detect an access request from a mobile station with a call currently in progress on another base transceiver station, in another cell. According to one aspect of the invention, the base transceiver station can include an adaptive antenna system including an adaptive antenna array and an adaptive antenna processor. The adaptive antenna processor can be configured for electronically steering a beam of the adaptive antenna array toward a location of the mobile station. The base transceiver station can also include a control processor. The control processor can control the adaptive antenna system to cause it to temporarily generate a wide area antenna pattern when transmitting a response to the mobile station based on the access request. According to one aspect of the invention, the response includes physical channel information useful to the mobile station for communicating with the base transceiver station on a traffic channel of the BTS.

After transmitting the response, the control processor controls the adaptive antenna array to continue communications with the mobile station on a traffic channel using adaptive array signal processing to produce a focused beam in a direction of the mobile station. The control processor can also control the adaptive antenna array after transmitting the response to produce a pattern of nulls for reducing co-channel interference with co-channel stations caused by transmissions from the base transceiver station to the mobile station. Further, the control processor can cause the base transceiver station to temporarily increase its transmitted RF power when transmitting the response from the base transceiver station to the mobile station. The increase in transmitted RF power level can at least partially compensate for a decreased gain when using the wide area antenna pattern.

DETAILED DESCRIPTION OF THE PREFERRED EMBODIMENTS

Figure 1:
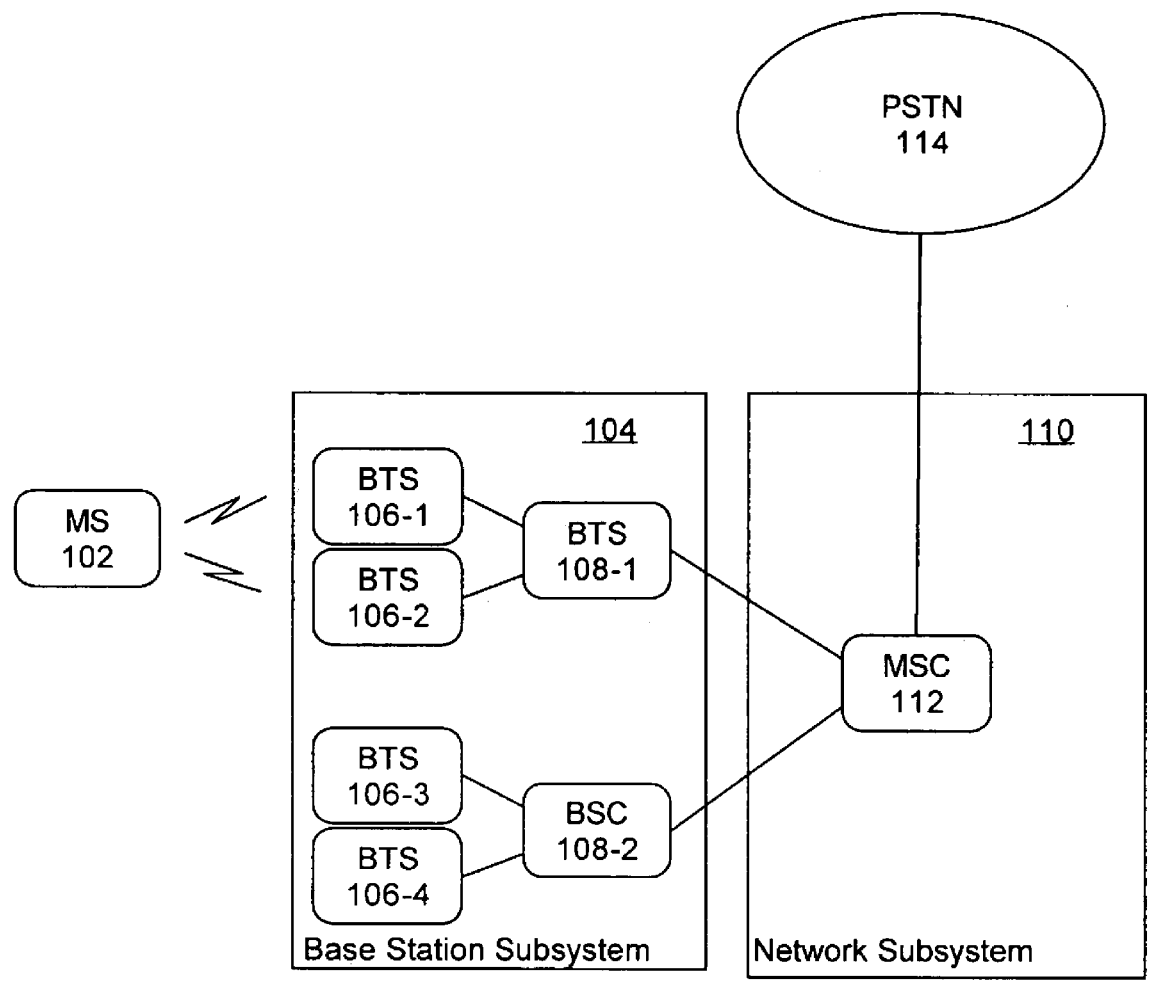
FIG. 1 is a drawing that shows a conventional architecture of a wireless telecommunication system.

FIG. 1 shows the architecture of a wireless mobile telecommunication system 100. The architecture shown is for a GSM based system. However, it should be understood that the inventive arrangements are not limited to use in GSM systems. Accordingly, the architecture shown is provided merely by way of example for better understanding the present invention. As shown in FIG. 1, a wireless mobile telecommunication system 100 based on the GSM standard can include a Mobile Station (MS) 102 that includes a Subscriber Identification Module (SIM) and the Mobile Equipment. The system also includes a Base Station Subsystem 104 that controls the radio link with the MS. A Network Subsystem 110 performs switching of calls. The Network Subsystem 110 can switch calls between mobile users, and between mobile users and wired network users. A primary component of the Network Subsystem 110 is the Mobile services Switching Center (MSC) 112. The MSC 112 connects calls within the GSM network and/or acts as a gateway to the Public Switched Telephone Network 114 or other networks.

The Base Station Subsystem 104 can include a plurality of Base Transceiver Stations (BTS) 106-1, 106-2, 106-3, 1064. Each BTS contains radio equipment for radio communications with a plurality of MS's 102. Each BTS is responsible for providing radio communications with MS units within an assigned cell. The Base Station Subsystem 104 can also include a plurality of Base Station Controllers (BSC) 108-1, 108-2. Each BSC 108-1, 108-2 can supervise the operation of two or more BTS units.

A BTS can utilize an adaptive antenna array to focus RF energy in a desired direction. According to one embodiment, the adaptive antenna array can be a so called smart antenna array that uses adaptive signal processing to focus RF energy in a desired direction and position nulls at interference sources. Adaptive antenna systems of this type are well known in the art. The direction in which RF energy is focused can be determined by analyzing spatial properties of a received signal coming from the mobile station.

Figure 2:
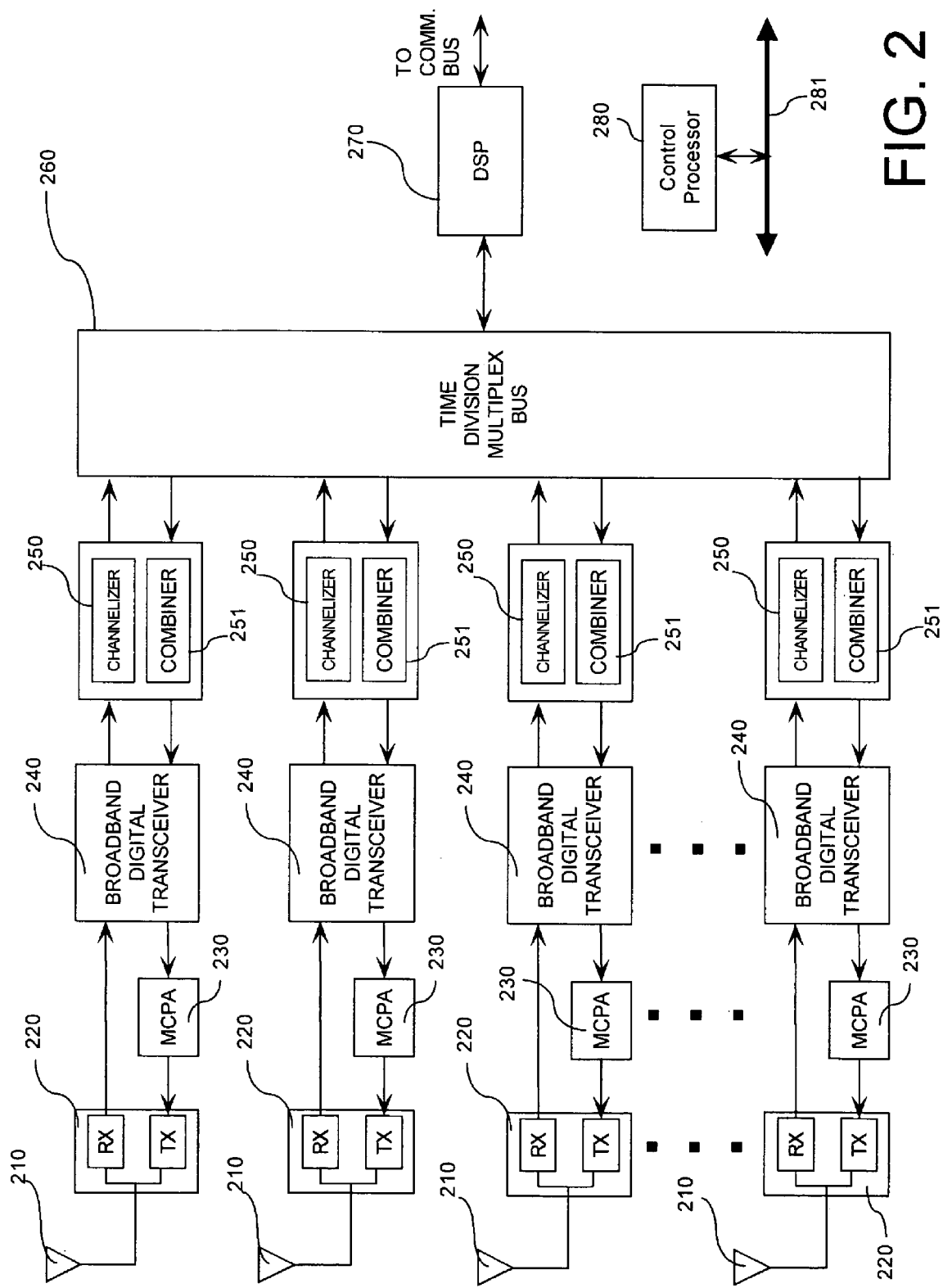
FIG. 2 is a block diagram that is useful for understanding a basic architecture of a wideband base transceiver station that includes adaptive antenna processing.

Referring now to FIG. 2, there is shown an example of a BTS that includes an adaptive array antenna system. The adaptive array can have a selected number of antenna elements 210. Each antenna element can have a dedicated receive apparatus chain comprising duplexer 220, broadband digital transceiver 240, and a channelizer/combiner 250 (including analog to digital converter). A suitable interface such as time division multiplex bus 260 can be provided for facilitation of communications between the dedicated receive apparatus chain and digital signal processor board (DSP) 270. The DSP 270 can provide signal processing, for example beam forming, signal modulation, signal calibration, etc. DSP 270 can include a plurality of individual digital signal processors for performing these tasks for each channel.

For transmission, each antenna element 110 has a dedicated transmit apparatus chain comprising duplexer 220, multi-carrier power amplifier (MCPA) 230, broadband digital transceiver 240, combiner 251 (including digital to analog coverter), time division multiplex bus 260, DSP 270, and associated connectors inclusive. Similar to its function on the receive path, DSP 270 can perform adaptive array beam forming. DSP 270 can also apply any other desired signal processing to the transmit signals.

A control processor 280 can be provided for controlling the operation of the major system components including the bus 260, and each channelizer 250, combiner 251, broadband digital transceiver 240, MCPA 230. The control processor can communicate with these system components using a control bus 281. Where an adaptive array approach is used, the control processor 280 can adjust a phase, amplitude or both for RF signals associated with all of the plurality of antennas of the antenna array. These operations can be performed in the channelizer and combiner blocks or within DSP 270. In this way the system can combine the RF signals to create an antenna pattern comprising a major lobe exhibiting gain in a direction of one of the plurality of mobile stations 102. The control processor 280 can also adjust a phase and/or amplitude of RF signals associated with each of the plurality of antennas 110 of the antenna array for combining the RF signals to create an antenna pattern comprising nulls in the direction of at least one other of the plurality of mobile stations concurrently operating on the common RF carrier frequency.

Handover Procedures

A handover is the switching of an on-going call to a different channel or cell. Various types of handovers can occur depending upon the architecture of the communication system. For example, in the GSM system, internal handovers within a cell can occur when transferring an ongoing call between different channels or burst periods of a serving cell. In contrast, external handovers can occur when transferring a call between (1) separate BTSs that are under the control of a common BSC, (2) BTSs under the control of different BSCs, where the BSCs are under the control of the same MSC, or (3) BTSs under the control of separate BSCs, where the BSCs are not under the control of the same MSC. External handovers usually occur when an MS communicating through one BTS moves from the coverage area of that BTS to the coverage area of another BTS. To maintain the call, the MS must transition from communicating with the current serving BTS to communicating with the BTS that the mobile is moving towards.

In order to identify when handover should occur and which cell the handover should be directed to, information is needed regarding the quality of the connection and signal power levels in adjacent cells. For example, in the mobile communication system known as GSM (Global System for Mobile Communications), each MS monitors a power level and signal quality (downlink signal) from the BTS of a cell that is currently serving the particular mobile station. The MS also monitors downlink signal power levels for BTSs in neighboring cells. Conversely, the BTS of each cell also monitors the power levels and quality of uplink signals received from mobile stations that it serves. The handover process can be triggered when this uplink or downlink monitoring indicates that low signal levels and/or poor signal quality exist in a current cell, and it is determined that an improved link quality can be obtained from an adjacent cell. Handover can also be initiated when the monitoring reveals that lower transmission power levels can be used for communications with a neighboring cell. Typically, this situation can arise when the MS is in a boundary region between adjacent cells.

The handover process can include more or fewer steps depending on the type of handover. The following flow process example describes an intercell handover process where the originating and target cells are managed by the same BSC. However, it should be understood that the invention is also applicable to other handover situations. For example, the inventive arrangement can also be utilized in those situations where the handover involves BTS units managed by different BSCs.

Figure 3:
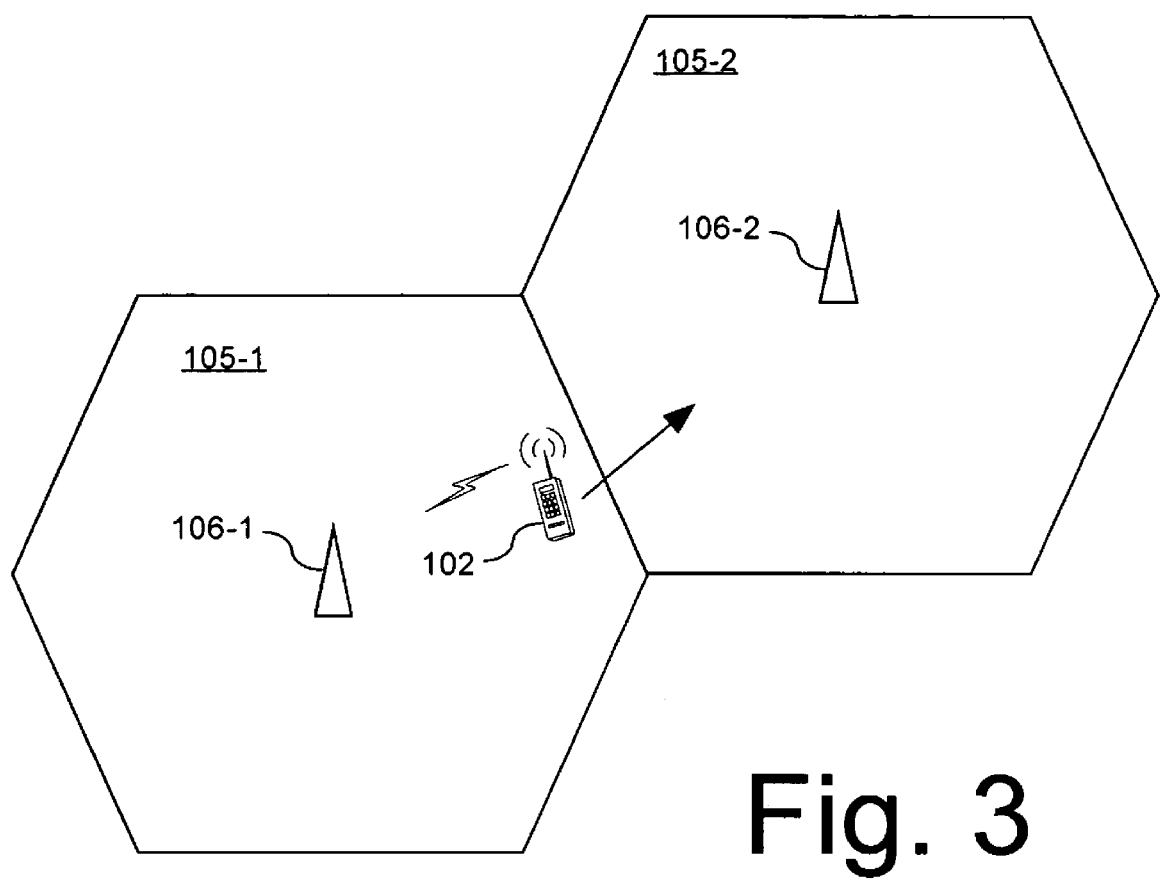
FIG. 3 is a drawing that is useful for understanding the handover process in a wireless telecommunication system.

Referring again to FIG. 1, the handover process can begin when a BTS 106-2 determines that a handover should occur for MS 102 that is currently being served. This situation is illustrated in FIG. 3 where MS 102 is shown moving from cell 105-1 containing BTS 106-1 toward cell 105-2 containing BTS 106-2.

Figure 4:
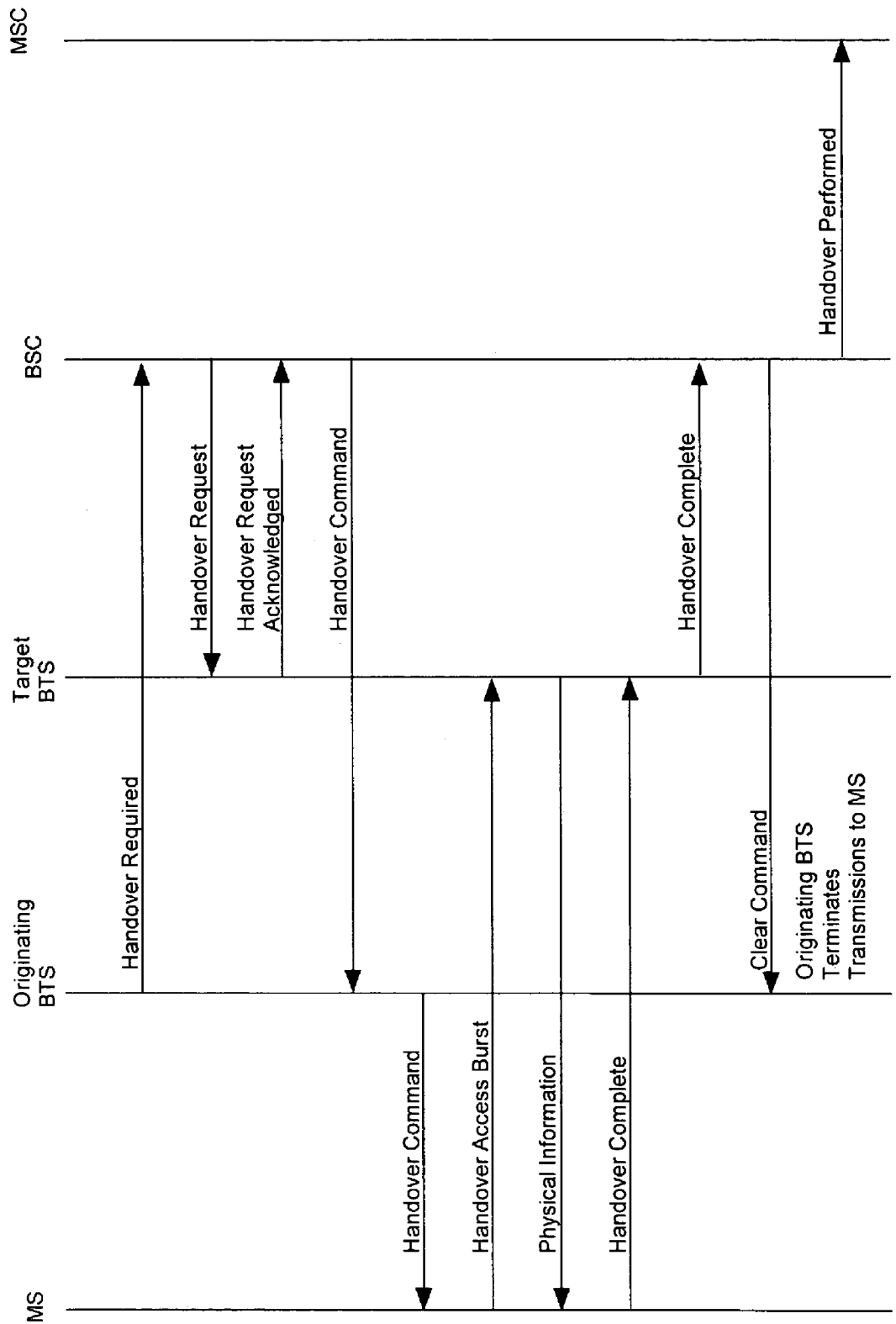
FIG. 4 is a process flow diagram that is useful for understanding a handover process.

FIG. 4 is a message flow diagram that depicts an intercell handover process where the originating and target cells are managed by the same BSC. The message flow can be somewhat different where the target cells are managed by different BSCs. However, the handover process in FIG. 4 is nevertheless useful for understanding the invention.

Referring now to FIGS. 1-4, the BTS 106-1 will send a 'handover request' message to BSC 108-1. The BSC will forward the handover request to BTS 106-2 that is to begin serving MS 102. This request will be acknowledged to the BSC 108-1 by the BTS 106-2. Thereafter the BSC 108-1 will send a handover command message to BTS 106-1. Once the handover command message is received by BTS 106-1 it will forward the handover command message to MS 102. Thereafter MS 102 will initiate a radio link with the BTS 106-2. In particular, MS 102 will send an "access burst" to BTS 106-2 on a RACH channel to initiate the radio link. The BTS 106-2 will respond by communicating assigned physical channel information to the MS 102. The MS 102 will acknowledge this channel assignment by communicating to the BTS 106-2 that the handover is complete. BTS 106-2 will forward this confirmation to the BSC 108-1 which will communicate a command to the originating BTS 106-1 that it is no longer responsible for communicating with MS 102. The BSC will also report to the MSC 112 that the handover is complete.

The foregoing description of the handover process is useful for understanding the invention. In this regard, a more detailed description of the various handover procedures can be found in "The GSM System for Mobile Communications" by Michel Mouly and Marie-Bernadette Pautet, 1992 (ISBN: 2-9507190-0-7). The entire disclosure of this publication is incorporated herein by reference. Still, it should be understood that the present invention is not limited to the handover procedures referred to herein. Instead, the invention can be applied to any handover procedure of a wireless cellular communication system.

GSM Burst Structure

Figure 5A:
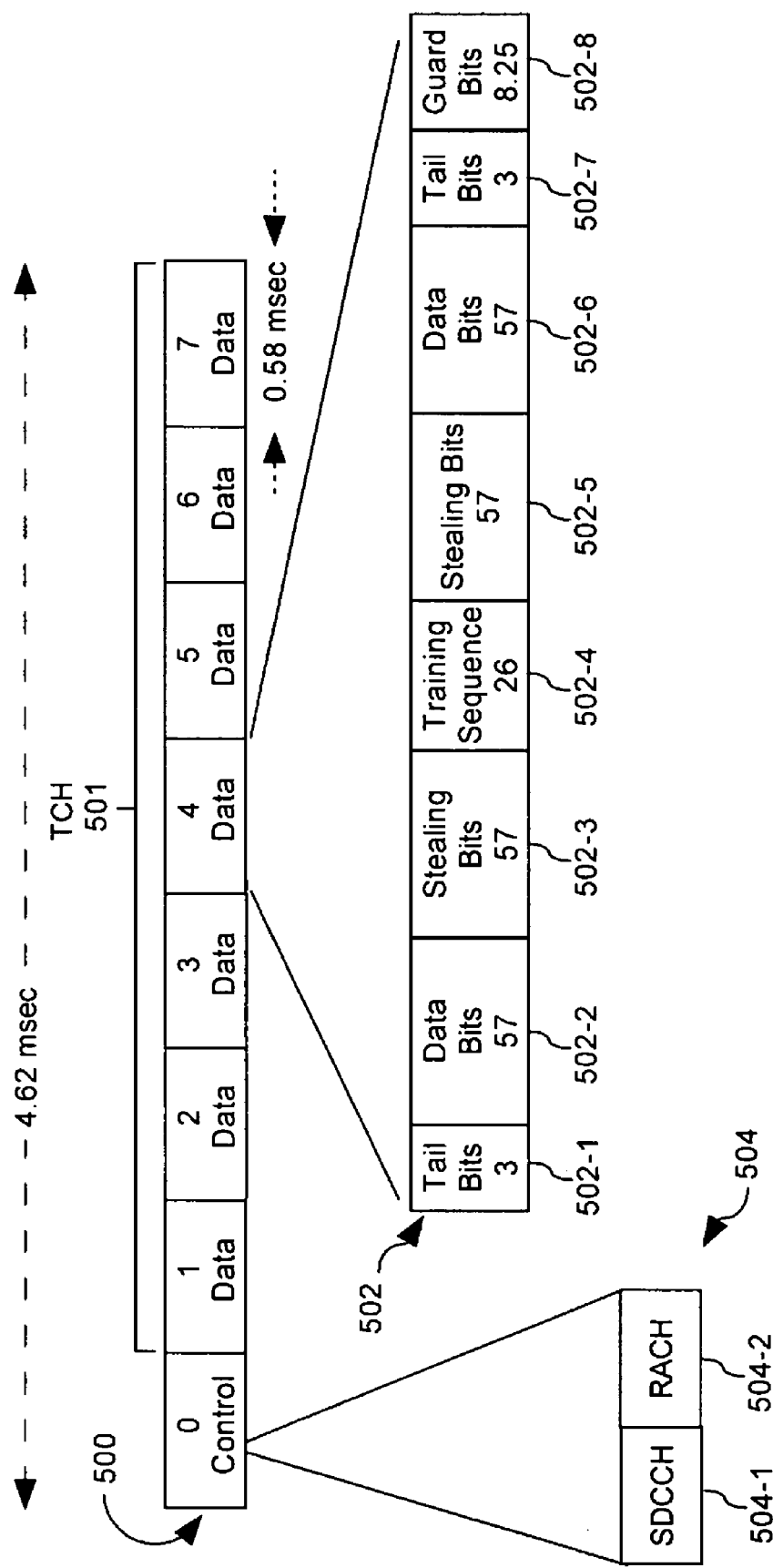
FIGS. 5a and 5b are drawings that are useful for understanding a burst structure in a GSM base wireless telecommunication system.
Figure 5B:
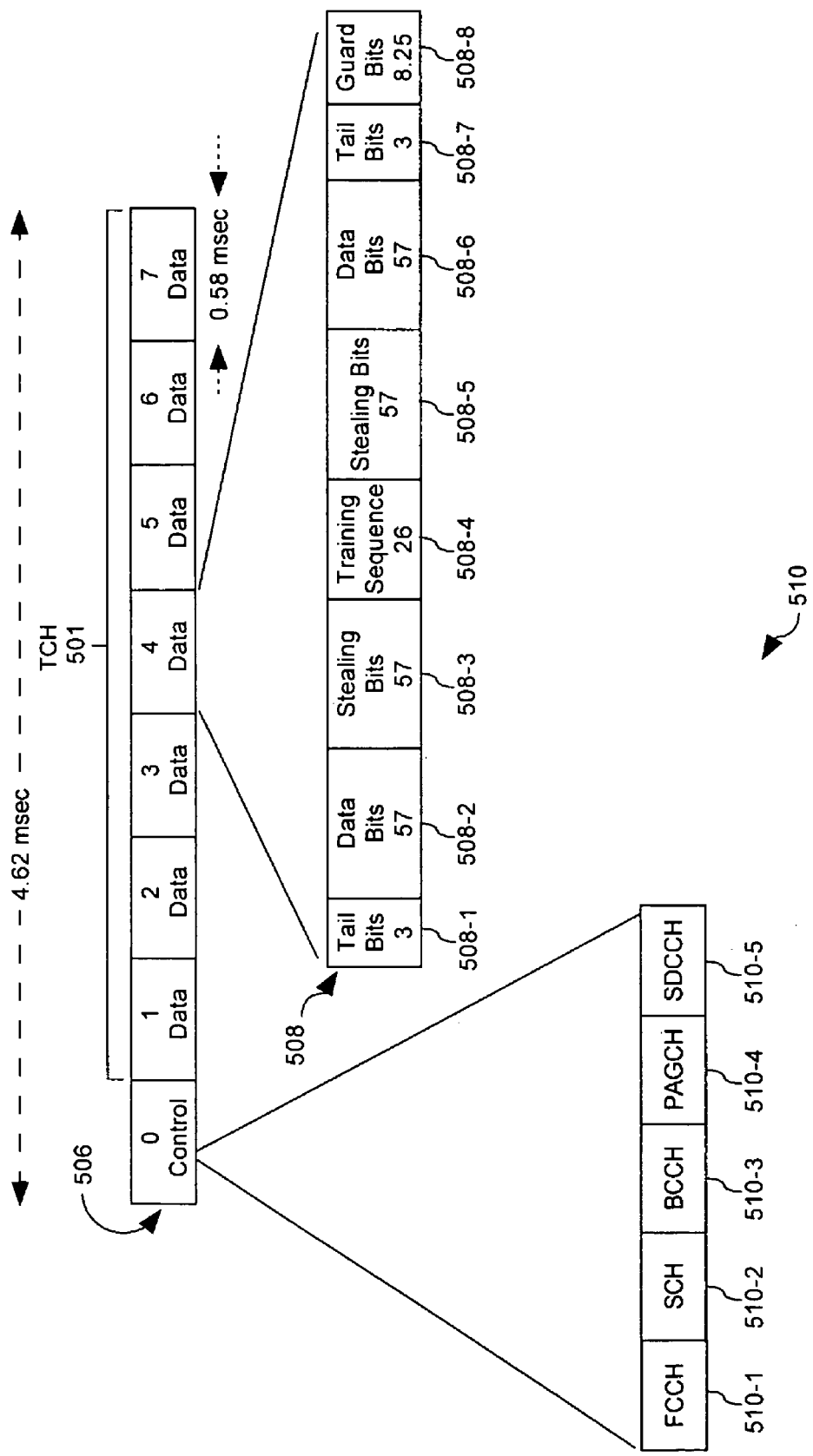

FIGS. 5*a* and 5*b* are useful for more fully understanding the signaling that occurs between a mobile station (MS) and a base transceiver station (BTS) during the handover process. FIG. 5*a* shows a typical uplink TDMA frame 400 comprising eight time slots, used for transmission to a BTS. In the GSM context, the time slots are called burst periods. The depicted GSM TDMA frame has a duration of 4.62 milliseconds, comprising eight burst periods, each having a duration of 0.58 milliseconds. Generally, for GSM type TDMA implementations which use a single RF carrier, one burst period is dedicated to transmitting control information, while the remaining burst periods are available to transmit traffic information. Traffic channels can carry conversations or data, as well as control information about mobile unit itself.

Referring to FIG. 5*a*, burst period 0 is a dedicated control channel while burst periods 1-7 support traffic. A full burst period of a given carrier frequency is commonly referred to as a channel. Portions of a burst period, or sub burst periods, assigned specific functions will be referred to herein as sub channels. Typical formats for the traffic sub channels and control sub channels are shown in burst period details 502 and 504, respectively. In GSM, there are 4 different types of bursts. These include (1) a normal burst, (2) a frequency correction burst, (3) a synchronous burst, and (4) an access burst. A normal burst is used to carry speech and data information. The structure of the normal burst is shown in detail 502. The frequency correction burst and synchronous burst have the same length as a normal burst. They have different internal structures to differentiate them from normal bursts. The frequency correction burst is used in Frequency Correction Channels (FCCH) and the synchronous burst is used in Synchronization Channels (SCH).

Detail 502 of a normal burst period 4 shows typical GSM format traffic sub channels including tail bits 502-1 and 502-7 which are used to indicate the beginning and end of a burst period. Data bits 502-2, 502-6 contain the digitized call information, while training sequence bits 5024 are used for equalization of multi path signals. Stealing bits 502-3, 502-5 are provided to indicate if suppression of burst period data and replacement with priority data is requested. Finally, guard bits 502-8 are provided to keep the individual slots from overlapping upon receipt. The number of bits contained in a typical traffic sub channel is shown below the sub channel designation in detail 502.

As noted earlier, in TDMA RF carrier implementations, one burst period will generally be a digital control channel. As shown in detail 504 of burst period 0, sub channels in the uplink control burst period generally include a stand alone dedicated control sub channel (SDCCH) 504-1 and a random access sub channel (RACH) 504-2. The SDCCH sub channel 504-1 is used to complete call setup and for transmission of messages. The RACH sub channel 504-2 is used by mobile users 18 to transmit an access burst for requesting a dedicated channel from the BTS.

Figure 6:
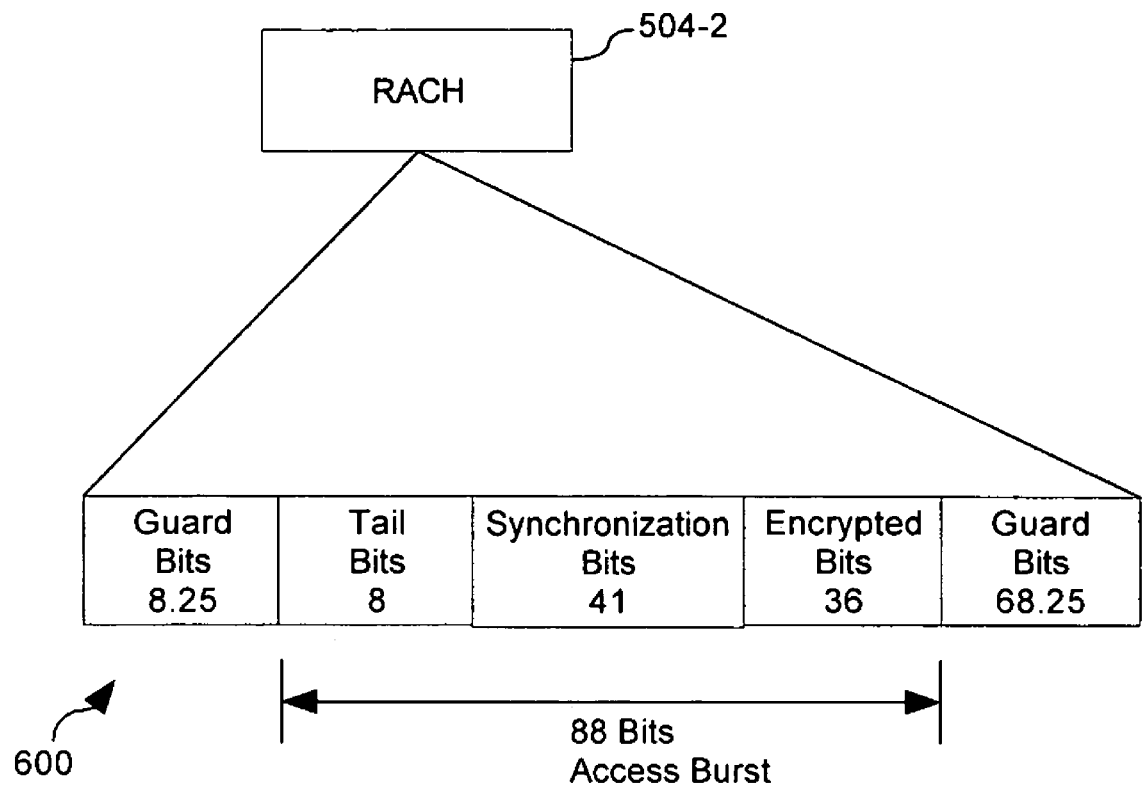
FIG. 6 is a drawing that is useful for understanding an access burst in a GSM based wireless telecommunication system.

The access burst is shorter than a normal burst, and is generally used only on the RACH channel described in relation to FIG. 5*a*. The access burst structure is shown in greater detail in FIG. 6. As illustrated therein, an access burst 600 can typically consist of 88 bits (compared to 148 bits for a normal traffic burst). These 88 bits can include 8 external tail bits 502, 41 synchronization bits, and 36 encrypted bits. 8.25 Guard bits precede the access burst and 68.25 guard bits follow the access burst. The access burst structure in FIG. 6 is typical of that used in GSM systems. However, it should be understood that the invention is not limited to the specific burst structure used in the GSM architecture.

FIG. 5b shows a typical GSM type eight burst TDMA frame 506 used in BTS to MS downlink communications. Generally, the information format in the traffic burst periods 1-7 remains the same compared to the uplink, but more control sub channels are included in the control burst period 0 (compared to the corresponding uplink control channel in detail 504), as shown in detail 510. Specifically, downlink control burst period 0 is comprised of a frequency correction sub channel (FCCH) 510-1, synchronization sub channel (SCH) 510-2, broadcast control sub channel (BCCH) 510-3, paging and access grant sub channel (PAGCH) 510-4 and SDCCH downlink sub channel 510-5. Every GSM cell broadcasts exactly one FCCH and one SCH, which are defined to be on time slot 0 in the TDMA frame. The FCCH sub channel 510-1 transmits frequency correction information for an MS 102 to correct its time base, while the SCH 510-2 sub channel transmits synchronization information for the mobile to synchronize to the framing structure of the network. The BCCH 510-3 sub channel transmits information to idle mobile users 18 such as local area identification and neighbor cell information. The PAGCH 510-4 sub channel is used to page a mobile and grant access to a MS 102 during call set up. Finally, the SDCCH subchannel 510-5 is used to transmit call setup information from BTS 106 to MS 102 to complete call setup.

A fast associated control channel (FACCH) carries the same information as the SDCCH. However, the SDCCH exists on its own, whereas the FACCH can replace part or all of a traffic channel. If at some time there is a need for a great deal of control information (e.g., during handoff), then the FACCH takes over the traffic channel (i.e., steals bursts). The flag bits indicate if the normal burst has been replaced with FACCH signaling information. Generally, the FACCH messages is divided and transmitted over 8 sequential channel bursts and the speech information that would normally be transmitted is discarded. When received, the FACCH message is reassembled into its original message structure. FACCH messages can be transmitted on the uplink or downlink channel.

Target Cell Downlink Focus and Nullinq

A BTS utilizing an adaptive array will typically analyze the received signals from the intended and co-channel users in order to generate a transmit solution directing a focused downlink signal as well as antenna pattern nulls. During a handover, the BTS that is targeted for the handover has not previously received a signal from the mobile station. Accordingly, the BTS will not have developed a downlink solution to focus its transmitted energy. If the BTS does not know where to transmit its energy, handover failures will occur, resulting in dropped calls.

1. Adapt on Access Burst

According to a first embodiment of the invention, an adaptive array of a BTS can generate a temporary or preliminary downlink solution for responding to a mobile station based on an access burst from a mobile station. Notably, the transmission of the access burst by a mobile station on the RACH sub channel presents an early opportunity during the handoff process for the target BTS to assign weighting factors to an adaptive array based on a geo-location of the mobile station.

Still, there are several difficulties with the foregoing approach. For example, the access burst is typically used by the base station to determine timing advance when a mobile is initially accessing a new cell. In many instances, the base station will be able to determine timing advance based on only one access burst. Consequently, a conventional BTS can have only a single opportunity to determine the spatial characteristics of the mobile station before it responds. Further, the GSM access burst is of shorter duration as compared to a normal burst. The relatively short duration of the access burst makes it more challenging to use the access burst for computing weighting parameters for the adaptive array.

Another problem with relying on the access burst to compute the downlink parameters for the BTS adaptive array relates to the difficulty in distinguishing the access burst of one mobile station from another. The access burst from one mobile, other than its spatial properties, is very similar in characteristic to an access burst from any other mobile. For example, the training sequence used by the BTS to adapt its receiver equalizer is the same for any transmitted access burst, whereas, a normal burst can have different training sequences depending upon which BTS the mobile station is communication with. As a consequence of this similarity, and the relatively short duration of the access burst, it can be difficult to generate accurate weights used by the adaptive array to form a transmitted signal to the mobile.

The foregoing problems can result in handover failures. For example, the limited available information can result in erroneous phase and amplitude weighting parameters for the adaptive array. This can result in a beam produced by the adaptive array that is poorly focused on the mobile station. If the beam is not properly directed toward the mobile station, then the mobile station may not receive the handover signals from the BTS. A second problem relates to generating a set of nulls in the antenna pattern produced by the adaptive array. Ideally, the nulls should be directed toward co-channel users in order to minimize the interference caused by the BTS when responding to the mobile station that produced the access burst. If the adaptive array is forced to rely on poor or limited data regarding the spatial position of the mobile station, then a null could be inadvertently directed toward the particular mobile station that the BTS is trying to communicate with. Either of these situations can result in failed handovers.

In order to address the foregoing limitations, the BTS can purposefully delay responding to an access burst from a mobile station. If the BTS does not respond to the access burst from the mobile station, the mobile will transmit another burst after a random period of time. The number of times the mobile station will re-transmit its access burst is limited by the system configuration parameters. Within these limitations, however, the BTS can force the mobile station to generate multiple access bursts by not responding immediately. The GSM access burst is typically used by the base station to determine timing advance when a mobile is accessing a new cell. Thus, the BTS can delay responding even though the BTS has already obtained the timing advance information that is needed from the access burst. The multiple access bursts thus generated by the mobile station can then be used by the BTS to gather additional information regarding the spatial characteristics of the mobile station. This information can be used to generate a more accurate solution for the adaptive array.

As an alternative, or in addition to the solution described above, a set of parameters for the adaptive array can be computed exclusive of any processing to generate nulls directed toward co-channel users. Such co-channel users can include other mobile stations or translating repeaters using the same channel as the mobile station that the BTS is trying to communicate with. Placement of nulls in the antenna beam provides the larger benefit of improving overall network performance. However, the primary goal during the handover process is to generate a sufficiently focused signal on the intended mobile, using what little information is available. Accordingly, the precise placement of nulls for co-channel users is a matter of secondary concern during the handover process. Further, it will be appreciated that the transmit beam solution for the adaptive array during the handover process can be used only for a limited time. For example, the transmit solution can be used only until such time as the mobile station starts transmitting normal bursts. Consequently, co-channel interference resulting from the handover process will be relatively minimal, even without the inclusion of nulls in the antenna pattern developed by the adaptive array. Once the mobile begins transmitting normal bursts, the BTS can revert to its normal adaptive processing to form focused transmit signal toward the intended mobile station and nulls toward co-channel mobile stations.

Figure 7:
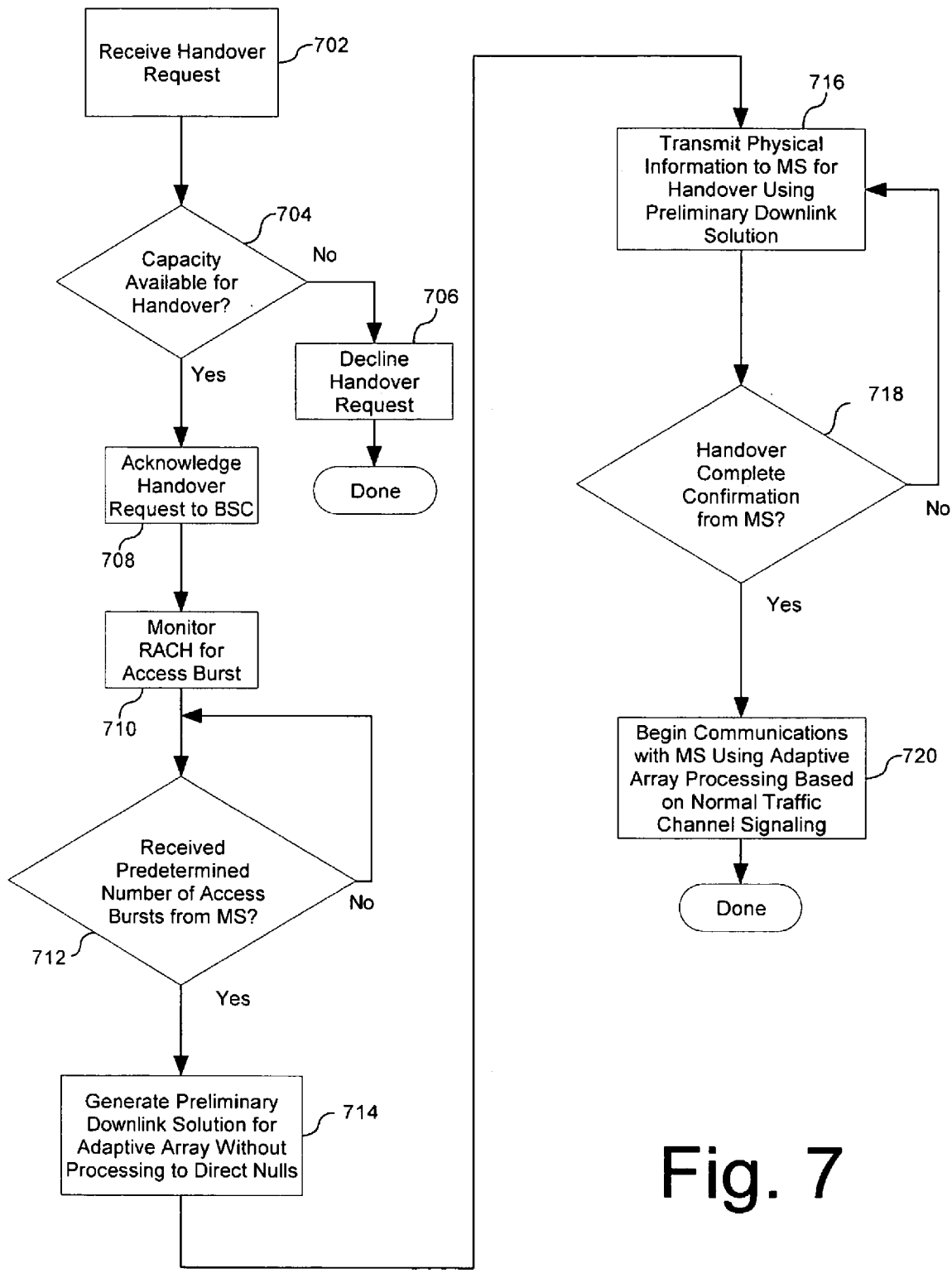
FIG. 7 is a flowchart that is useful for understanding a method for performing a handover according to a first embodiment of the invention.

Referring now to FIG. 7, there is shown a flow chart that is useful for understanding a method in accordance with the inventive arrangements. In step 702, a BTS can receive a handover request from a BSC or other device authorized to request handovers. In step 704, the BTS can check to determine if it has the necessary capacity available to accept the handover. If not, then the BTS can decline the handover request in step 706. Otherwise, in step 708 the BTS can acknowledge the handover request to the BSC or other device requesting the handover. Thereafter, in step 710, the BTS can begin monitoring its RACH channel for an access burst from the new mobile station that it is to begin serving.

In step 712, the BTS can determine if a predetermined number of access bursts have been received from the mobile station to provide the necessary timing information for the BTS. The precise predetermined number of access bursts associated with this test will depend to some extent on system configuration parameters. However, the BTS can advantageously wait until two or more access bursts have been received from the mobile station, even if the BTS receives all of the necessary timing information in a first access burst. The additional access bursts can be used as data to help determine the geospatial characteristics of the mobile station. This information can be used to generate a set of weighting parameters for a downlink transmit beam pattern that will be used by the BTS for responding to the mobile.

Once the predetermined number of access bursts has been received by the BTS in step 712, the system can generate a preliminary downlink solution for the adaptive array in step 714. Advantageously, the preliminary downlink solution in step 714 can be computed without any attempt to direct nulls at co-channel users. This approach can minimize the possibility that a null is inadvertently directed toward the intended mobile station during the handover process. Also, the focus of the downlink antenna beam pattern can be relatively broad. For example, with a 4 element antenna array, the focused downlink antenna beam pattern need only be accurate within +/−25% of the actual location of the intended mobile.

Using the preliminary downlink solution calculated in step 716, the BTS can transmit physical information to the mobile station relating to its assigned traffic channel and so on. For the GSM standard, the message can include transmission parameters such as timing advance and transmit power. However, the invention is not limited in this regard. In step 718, the BTS can check to determine if it has received a confirmation from the mobile station that it has received its channel assignment information, thereby indicating that the handover is complete. If the confirmation is not received, the physical information can be re-transmitted. Once, handover confirmation ahs been received from the mobile station, then in step 720 the BTS can begin communications with the mobile station using conventional adaptive array processing base on the normal traffic signaling. This processing can include focusing beams of RF energy at the intended mobile station and directing nulls at co-channel users.

2. Apriori Analysis

If the BTS in the target cell is capable of receiving and analyzing the uplink signal of the mobile station while it is on the originating cell, then it can determine a downlink focus solution prior to handover. Accordingly, when the handover process begins, the target cell BTS will already have a downlink focus solution for communicating with the handover. This antenna downlink solution is somewhat less optimal as compared to the situation where the transmissions from the mobile station are analyzed on the target frequency channel. For example, the downlink focus solution would need to compensate for frequency differences between the originating and target radio channels. However, the resulting downlink focus solution can be adequate for facilitating communications between the target BTS and the mobile station during the handover process.

If the target BTS is to also direct nulls toward co-channel users during the handover process, then it must analyze the co-channel users to determine a nulling solution. Notably, the nulling solution cannot be determined based on the radio channel the mobile station is using to communicate with a BTS in the source cell since that is not the radio channel that BTS will use during handover in the target cell. Instead, the nulling solution must be determined based on the radio channel that the mobile will be using when it accesses the target cell. The solutions for the transmit beam directed toward the mobile and the nulls directed at co-channel users during the handover process can be combined to produce a single set of weighting factors prior to handover.

Those skilled in the art will appreciate that in order to implement the inventive arrangements, it can be advantageous if the source and target cells are synchronized. For example, it can be advantageous for the BTS in the source cell to directly or indirectly communicate the uplink channel information of the mobile station to the target cell. In this way the signal from the intended mobile can be analyzed by the target cell BTS prior to handover. The synchronization referred to herein can be facilitated by the BSC. However, the invention is not limited in this regard and any other suitable communication or data link can be used for this purpose.

Notably, the foregoing solution is particularly advantageous for use with wideband BTSs that have receivers capable of receiving signals over a broad range of frequencies. Such wideband receiver capabilities can facilitate receiving signals on channels that are not normally assigned to the target base station. In contrast, a narrowband base station may require a dedicated receiver for receiving signals from mobile stations not normally assigned to the target base station.

Figure 8:
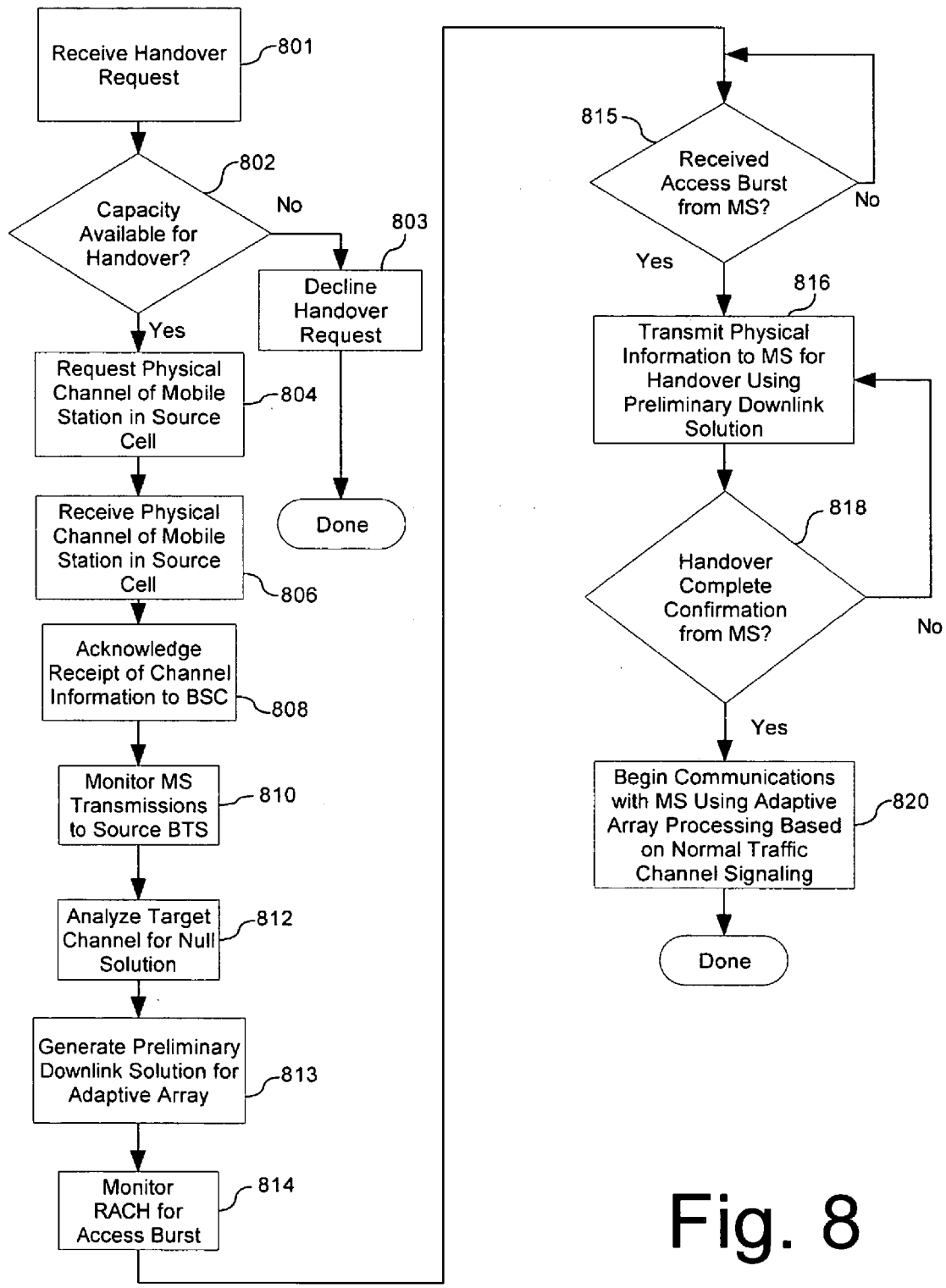
FIG. 8 is a flowchart that is useful for understanding a method for performing a handover according to a second embodiment of the invention.

Referring now to FIG. 8, there is shown a flow chart that is useful for understanding how the foregoing apriori analysis method can be implemented. The process can begin in step 801 when the target BTS receives a handover request. The handover request can come from a BSC or other control device depending on the architecture selected for the system. In step 802, the target BTS can determine if it has capacity available for a handover. If not, the target BTS can decline the handover request in step 803. However, if the target BTS has capacity for serving another mobile unit, then in step 804 it can request information relating to the physical channel for the mobile station in the source cell. In step 806, the target BTS can receive the information from the BSC or other control device concerning the physical channel that the mobile station is currently using in the source cell. Thereafter, in step 808, the target BTS can acknowledge the receipt of the channel information to the BSC.

In step 810, the target BTS can begin monitoring transmissions from the mobile station to the source BTS. In step 812, the target BTS can also analyze the target channel the mobile will use to access the target BTS for the purpose of developing a null solution. In this case, the target channel will be the RACH channel of the target BTS. Using the information from the foregoing monitoring steps, the target BTS can in step 813 generate a preliminary downlink solution for the adaptive array. In this regard, those skilled in the art will appreciate that the BTS would need to modify the adaptive array weighting factors associated with the downlink focus solution to compensate for frequency differences between the originating and target radio channels. Those skilled in the art will likewise appreciate that it can be desirable to combine the downlink focus solution for communication with the mobile station with the null solution.

In addition to developing the preliminary downlink solution, the BTS in the target cell can advantageously begin monitoring its RACH channel in step 814 to determine if it has received an access burst from the mobile station. RACH channel monitoring can begin concurrently with step 810 or 812. Alternatively, RACH channel monitoring can begin after the target BTS generates a preliminary downlink solution. In any case, the target BTS will determine whether an access burst has been received from the mobile station in step 815. If the access burst is received, then the target BTS can respond by transmitting any necessary information to the mobile station in step 816. For example, the target BTS can respond to the access burst from the mobile station by transmitting physical channel information for communicating with the target BTS. For the purposes of these transmissions, the target BTS can use the preliminary downlink solution and any nulling solution it has generated in step 813.

In step 818, the target BTS can determine whether it has received a handover confirmation signal from the BTS. If not, the physical channel can be retransmitted in step 816 after a period of time. If the target BTS does receive such handover confirmation in step 818, then in step 820 the target BTS can begin communications with the mobile station on whichever traffic channel has been assigned to the mobile station. At this point, the target BTS can rely on whatever conventional methods are used to control its adaptive array.

3. Transmit Wide Area on Initial Access

According to a third embodiment of the invention, the target base station could transmit a wide area pattern on the initial transmit signal after handover. Once sufficient uplink signal has been received from the mobile and analyzed, the base station can revert to full adaptive processing for determining a transmit solution. This would require transmitting at higher power, which could cause additional interference for co-channel users for the brief period during wide area transmission. Also, more RF power is needed for the wide area transmission. Because of the energy focusing effect of the adaptive array system, less RF energy is usually required. For example, using a four element transmit array, 6 dB less energy is needed for focused downlink transmissions as compared to the situation where there is no focusing of RF energy. Accordingly, in the four element array example, 6 dB more energy would be required for transmitting the wide area pattern. However, many BTSs rely on a shared wideband multichannel power amplifier (MCPA) for transmissions to mobile stations. Where such MCPAs are used, sufficient power must be available prior to handover to ensure the MCPA is not overdriven. According to one embodiment, power management could be accomplished utilizing the techniques described in U.S. Pat. No. 6,477,388 to Schmutz. Utilizing the power management techniques described therein, the BTS can determine if the MCPA has sufficient reserve power available prior to transmitting so that the amplifier is not overdriven. If there is not sufficient power, the handover can be denied and the mobility management function of the base station system will select another cell candidate for handover.

Figure 9:
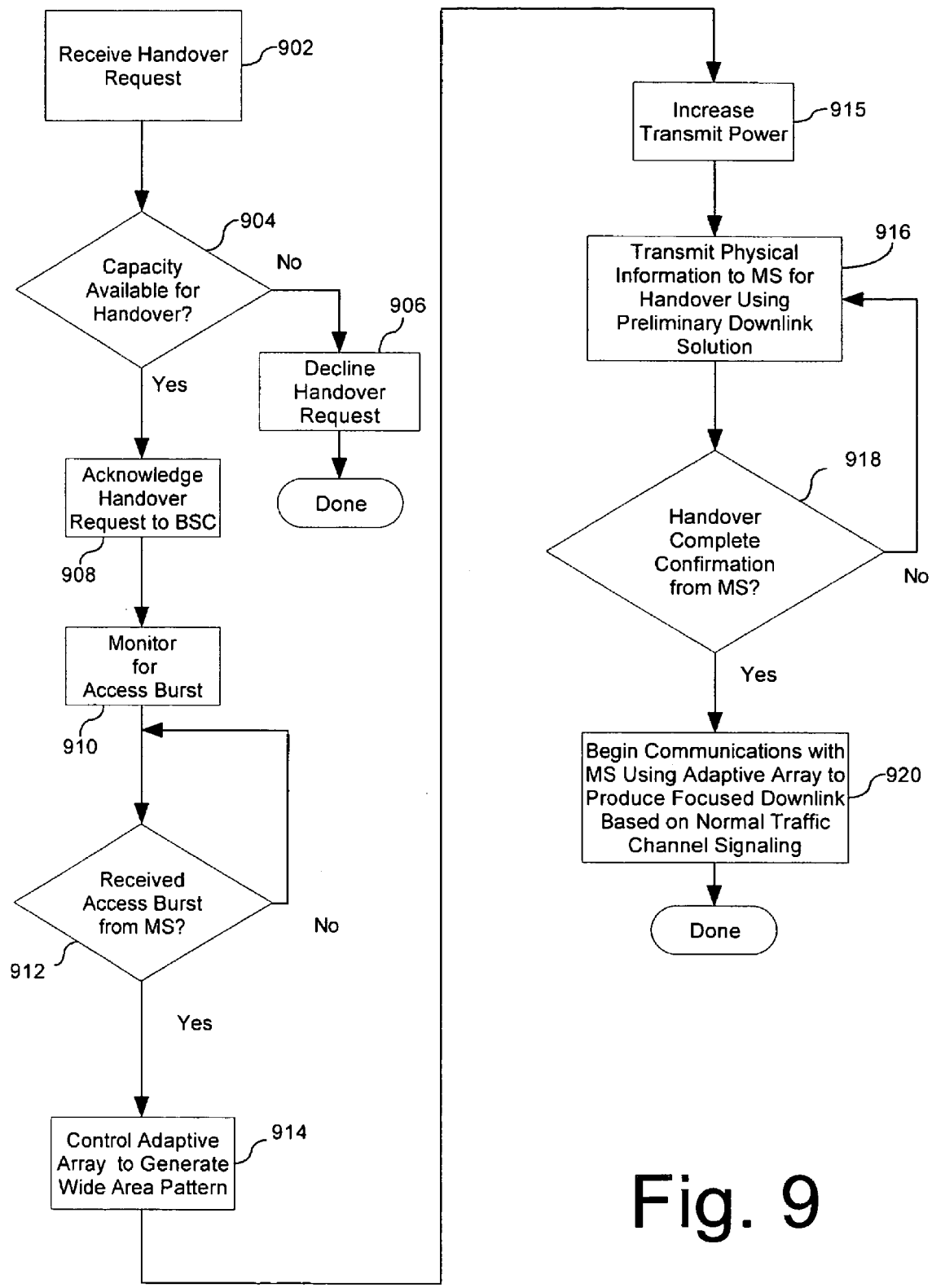
FIG. 9 is a flowchart that is useful for understanding a method for performing a handover according to a second embodiment of the invention.

Referring now to FIG. 9, a flowchart is provided that is useful for understanding the invention. The process can begin in step 902 when the BTS receives a handover request. The handover request can originate without limitation from a BSC, a neighboring BTS, or any other control device forming a part of the wireless network. When the handover request is received, the BTS can check to determine if it has available capacity for accommodating the handover request. This check can include without limitation checking on the availability of traffic channels, and checking on the availability of sufficient capacity to produce RF power in an MCPA. If the BTS does not have capacity to accommodate the handover request, then the BTS can decline the handover request in step 906. Otherwise, the BTS can acknowledge the handover request to the BSC in step 908.

Subsequent to acknowledging the handover request, the BTS can monitor a mobile station access channel to determine if the mobile station is requesting access to the services of the BTS. As used herein, the term "access channel" can include any channel that is used in a wireless system to request access to the services of the BTS. For example, in the GSM context, the access channel can be a RACH channel and the BTS can monitor the channel to determine if an access burst has been received from the mobile station. In step 912, if an access request has been received, then the BTS will continue on to step 914. In step 914, the BTS can control its adaptive antenna array system to generate a wide area pattern. This wide area pattern can include a generally omni directional pattern but is not limited to patterns that are precisely omni directional. For example, any antenna pattern that is broad enough to cover an entire cell and free of any substantial nulls can be used for this purpose. In order to generate the omni directional pattern, the BTS can select a single antenna from the adaptive array on which signals will be broadcast. Alternatively, a plurality of antennas comprising the adaptive array can be used for this purpose, provided that the resulting antenna pattern is generally omni directional.

The flow chart in FIG. 9 shows that the wide area pattern generated in step 914 occurs after an access burst is received from the mobile station. However, it will be appreciate that the invention is not limited in this regard. Instead, the wide area pattern can also be generated after step 908 and before step 910. Controlling the adaptive array to generate such a wide area pattern during this monitoring period can be advantageous as it increases the likelihood that the BTS will detect an access burst transmitted by a mobile station located in any direction relative to the BTS adaptive antenna array.

In step 915, the BTS can optionally increase its transmitter power level to compensate for the reduced gain of the wide area antenna pattern. For example, if the adaptive array is comprised of four antenna elements, 6 dB more power can be needed to cover an equivalent area as compared to when adaptive processing is used to focus the transmitted RF energy. However, it can be desirable in some instances to use somewhat more or less power to address co-channel interference issues. In step 916, the BTS can transmit to the mobile station any information that may be necessary or useful for communicating with the BTS on a traffic channel. In the GSM context, this information would typically include physical channel information. However, those skilled in the art will appreciate that the invention is not limited in this regard.

In step 918, the BTS can check to determine if it has received confirmation from the mobile station that the handover process has been completed. If this confirmation is not received, then in some instances, it can be desirable for the BTS to retransmit the selected information in step 916. If confirmation is received from the mobile station in step 918, then the BTS can begin communicating with the mobile station on a traffic channel in step 920. These communications can include the use of conventional adaptive array techniques for mitigating co-channel interference.

We claim:

1. A method comprising:
   receiving, at a second base transceiver station, an access burst from a mobile station with a call already in progress with a first base transceiver station, and requesting service from said second base transceiver station;
   electronically steering a beam of an adaptive antenna array of said second base transceiver station toward a location of said mobile station based on said access burst, wherein said beam of said adaptive antenna array exhibits gain in a first direction of said mobile station, and wherein said second base transceiver station creates an antenna pattern comprising nulls in a second direction of a second mobile station operating on a common RF carrier frequency;
   receiving a predetermined number of additional access bursts by said second base transceiver station; and
   determining, at said second base transceiver station, a set of weighting parameters based on said additional access bursts, wherein said set of weighting parameters is configured to produce said antenna pattern for said adaptive array.

2. The method according to claim 1, further comprising generating a set of weighting parameters for said adaptive antenna array based on said access burst configured to produce said antenna pattern for said adaptive array exclusive of nulls intentionally positioned for avoiding interference with co-channel users.

3. The method of claim 1, wherein said set of weighting parameters is configured to produce said antenna pattern for said adaptive array exclusive of nulls intentionally positioned for avoiding interference with co-channel users.

4. The method of claim 3, further comprising responding, using said second base transceiver station, to said mobile station responsive to said additional access bursts.

5. A system, comprising:
   a base transceiver station;
   a receiver configured to receive at said base transceiver station an access burst from a mobile station with a call already in progress and requesting service from said base transceiver station;
   a receiver signal processor for detecting said access burst; and
   an adaptive array antenna system configured to electronically steer a beam produced by said adaptive array antenna system toward a location of said mobile station based on said access burst, wherein said beam of said adaptive antenna array system exhibits gain in a first direction of said mobile station, and wherein said base transceiver station creates an antenna pattern comprising nulls in a second direction of a second mobile station operating on a common RF carrier frequency,
   wherein said receiver signal processor is configured to detect a predetermined number of additional access bursts before said base transceiver station transmits a response to said access burst,
   wherein said adaptive antenna array system is configured to generate a set of weighting parameters for said adaptive antenna array based on a plurality of said predetermined number of additional access bursts,
   wherein said adaptive antenna array is configured to determine said weighting parameters configured to produce said antenna pattern for said adaptive array exclusive of nulls intentionally positioned for avoiding interference with co-channel users.

6. The system according to claim 5, wherein said adaptive array is configured to generate a set of weighting parameters configured to produce said antenna pattern for said adaptive array exclusive of nulls intentionally positioned for avoiding interference with co-channel users.

* * * * *